United States Patent [19]

Farrell et al.

[11] Patent Number: 5,122,399
[45] Date of Patent: Jun. 16, 1992

[54] PAPERBOARD BOTTLE

[75] Inventors: Robert A. Farrell, Silver Springs, Md.; Hampton E. Forbes, Newark, Del.; Todd H. Huffman, Richmond, Va.; William R. Rigby, Newark, Del.

[73] Assignee: Westvaco Corporation, New York, N.Y.

[21] Appl. No.: 775,846

[22] Filed: Oct. 15, 1991

[51] Int. Cl.⁵ .................... B65D 23/02; B65D 5/40; B65D 5/42

[52] U.S. Cl. .................. 428/34.2; 428/35.7; 428/36.6; 428/58; 428/215; 215/1 C; 215/12.2; 220/417; 220/418; 220/454; 220/458; 220/462; 229/3.1; 229/DIG. 4; 222/183

[58] Field of Search ............ 215/1 C, 122; 220/417, 220/418, 454, 458, 462, 4.24, 421, 4.27; 428/34.2, 35.7, 36.6, 215, 58; 229/3.1, 111, 105, 75, DIG. 4, 112; 426/124; 53/175, 170, 449

[56] References Cited

U.S. PATENT DOCUMENTS

| | | | |
|---|---|---|---|
| 2,959,812 | 11/1960 | Allen | 425/523 |
| 3,160,326 | 12/1964 | Sturdevant | 222/183 |
| 3,324,214 | 6/1967 | Schaich | 264/515 |
| 4,070,429 | 1/1978 | Uhlig | 264/89 |
| 4,078,715 | 3/1978 | Larsson | 229/DIG. 4 |
| 4,256,231 | 3/1981 | Cioc | 215/1 C |
| 4,342,399 | 8/1982 | Stirling | 215/12.2 |
| 4,696,840 | 9/1987 | McCullough | 428/35.7 |
| 4,824,504 | 4/1989 | Kagata | 156/216 |
| 5,009,939 | 4/1991 | Goldberg | 229/3.1 |

Primary Examiner—Ellis P. Robinson
Assistant Examiner—Rena L. Dye
Attorney, Agent, or Firm—W. A. Marcontell; R. L. Schmalz

[57] ABSTRACT

A bottle type container is fabricated by blow molding a continuous wall liner of thermoplastic polymer integrally to the interior wall surface of an oppositely matched pair of paperboard cladding jackets. Paperboard cladding jackets respective to each pair are joined substantially edge-to-edge along the meeting seam exclusively by the continuous liner wall lap. For container stability when resting on a flat surface, at least one folded ridge is formed in the bottom edge panel of both jackets.

12 Claims, 4 Drawing Sheets

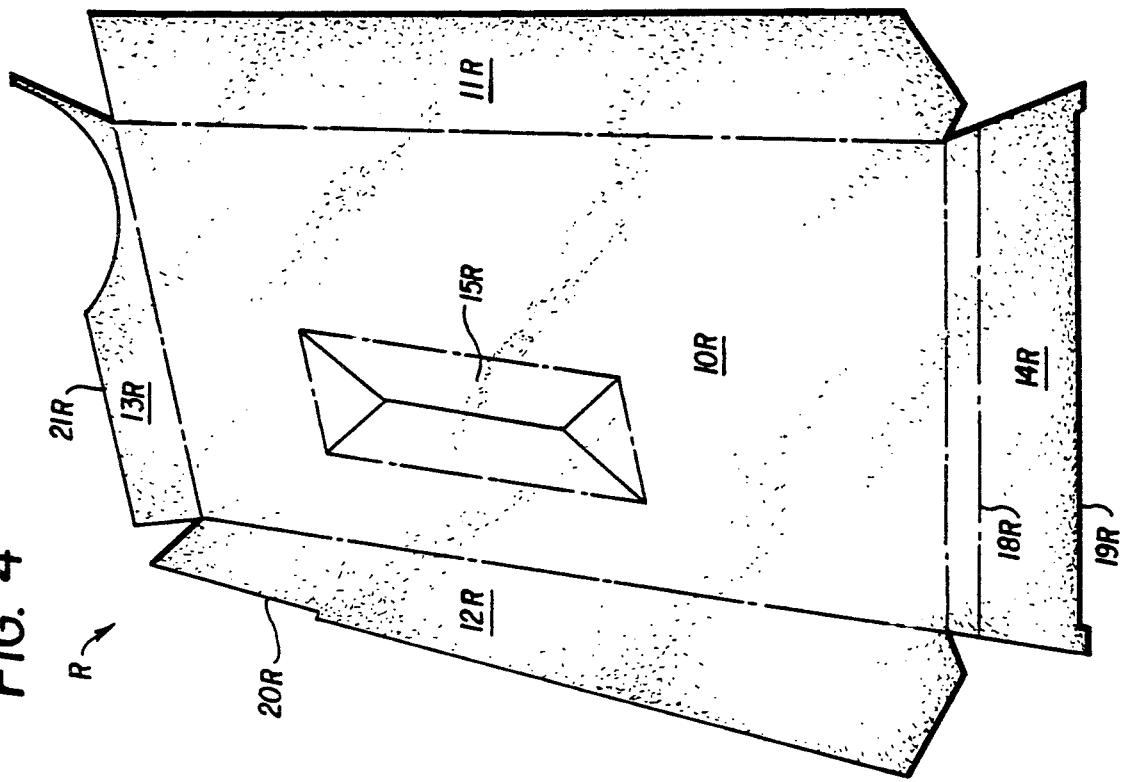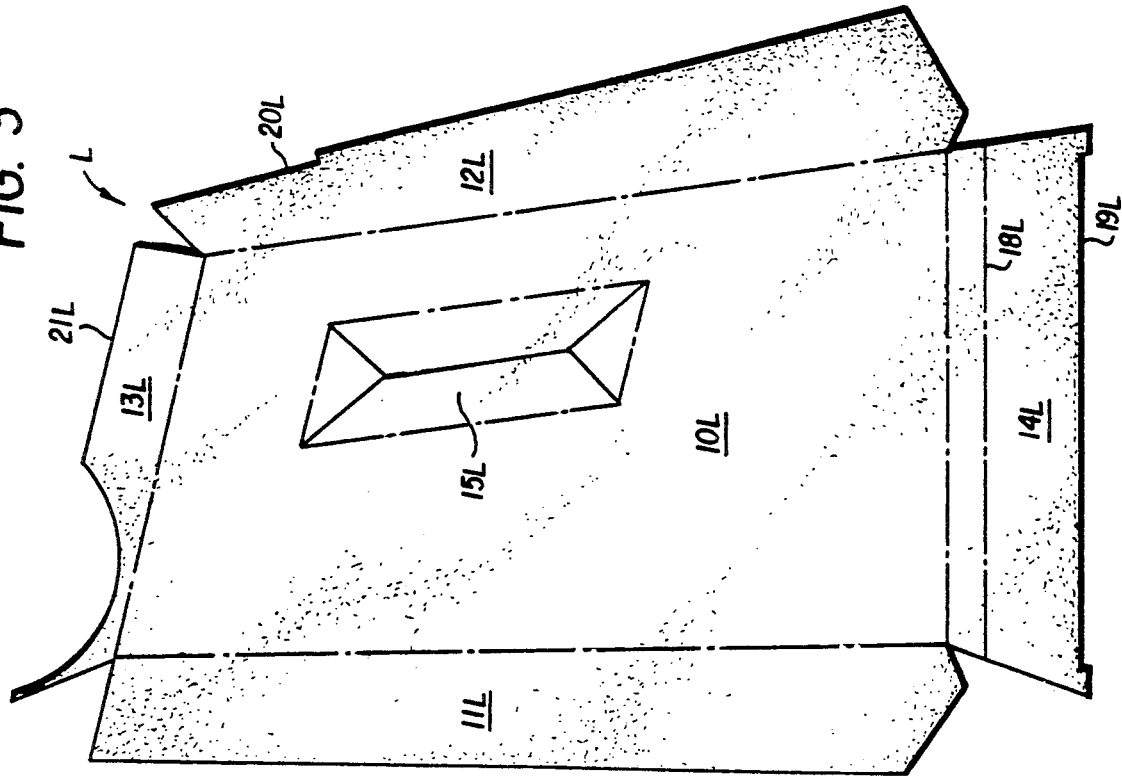

PAPERBOARD BOTTLE

BACKGROUND OF THE INVENTION

1. Field of the Invention

The present invention relates to composite material containers suitable for transport and storage of liquid food products, household cleaners and other fluent materials.

2. Description of the Prior Art

Utility for the present invention is focused upon recloseable liquid containers in consumer sizes of one to five liters such as is used for milk, fruit juice, bleach, automotive antifreeze and household cleaning chemicals. A considerable portion of the present market demand for such containers is provided by blow molded plastic containers as are represented by those described by U.S. Pat. No. 4,070,429 to A. R. Uhling.

Blow molding is a term of art used to describe the process by which a hollow, tubular parison of hot, viscous thermoplastic polymer is extruded into a recloseable mold cavity. When sufficient parison material is in place within the closed mold cavity and both ends of the parison tube are closed as by pinching, an inflation needle is inserted into the closed parison volume and pressurized gas released therethrough. Expansion of the pressurized gas within the closed parison expands the hot thermoplastic walls of the closed parison against the closed mold walls thereby forming the desired final article shape. So formed, the mold confined thermoplastic article is chilled within the mold to solidification. Thereafter, the mold cavity is opened to release the article so formed.

Generally, this process is practiced with a monolayer thermoplastic parison but multiple layer laminations are known to the art.

Product or contents identification and information is applied after the vessel is formed. This may be by masked exterior spray application or a printed paper label secured adhesively to the exterior article walls. In either case, the graphics field is somewhat limited.

Along a separate line of development, recloseable liquid containers are also made from wax or plastic coated paperboard. These containers are usually flat sided, square sectioned rectangles folded from flat sheet stock. An attractive marketing feature of such containers is the capability of complex graphic presentations printed directly upon the exterior container surfaces before folding. On the negative side, the liquid seal integrity of paperboard containers is less than satisfactory.

It is, therefore, an object of the present invention to combine the superior features of blow molded and paperboard containers without the corresponding negative consequences.

Another object of the present invention is to provide a composite material liquid container having a paperboard exterior structural jacket having preprinted graphics and an blow molded interior liquid seal.

Another object of the present invention is to provide a high production rate composite material bottle that relies upon a minimal quantity of polymer as an interior liquid seal liner.

Another object of the present invention is the provision of a blow molded liquid container having improved rigidity and stiffness.

SUMMARY OF THE INVENTION

These and other objects of the invention to be hereafter described or made apparent from the description, are served by a recloseable container of the bottle type comprising a pair of exterior paperboard cladding jacket halves, butt joined along meeting edges by the bridging lap of a blow molded polymer lining. Such lining is integrally bonded to the entire interior surface of the paperboard cladding jacket halves and continuously converges into a bottle-neck opening. In the bottle-neck region, the polymer wall thickness is increased to achieve free-standing rigidity without reliance upon an exterior paperboard reinforcement.

The sides and bottom of the bottle are structurally rigidified by the cladding jacket halves which are fold-formed from sheet stock paperboard: a suitable surface for high quality print graphics. After printing and cutting, the flat paperboard cladding jacket blanks are magazine fed to a transition mechanism which breaks the paperboard blanks along the designated fold lines and inserts the erected blank into the exposed cavities of an open pair of blow mold half sections carried by a multiple mold, blow molding wheel machine. The two mold half sections are passed on opposite sides of a continuously extruded polymer parison aligned to fall tangentially against the blow molding wheel machine arc. With the parison aligned between the open mold halves and the erected blanks positioned within each mold half cavity, the mold halves are closed upon the parison to pinch it closed. Thereafter, the parison is inflated with a pressurized blowing gas such as air to line the blanks and lap the two blank formed cladding jackets together. When parison expansion is complete, the hot polymer is chilled to solidification. Ejection from a mold is followed by final trimming and content filling.

To provide a flat-bottom resting surface for the bottle, both cladding jackets halves are given a straight line crease along the bottom edge panel. The finish mold configuration of this arrangement is two parallel-planar fold edges in the nature of rails offering stable support upon a flat surface.

BRIEF DESCRIPTION OF THE DRAWINGS

Relative to the drawings wherein like reference characters designate like or similar elements throughout the several figures of the drawings:

FIG. 3 is a plan view of the left hand paperboard blank profile.

FIG. 4 is a plan view of the right hand paperboard blank profile.

DESCRIPTION OF THE PREFERRED EMBODIMENT

Figure 1:
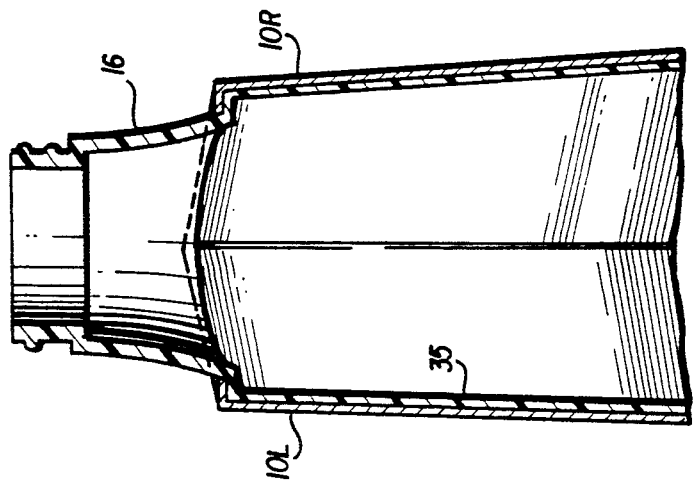
FIG. 1 is a side elevational view of the finished bottle article of the invention.
Figure 2:
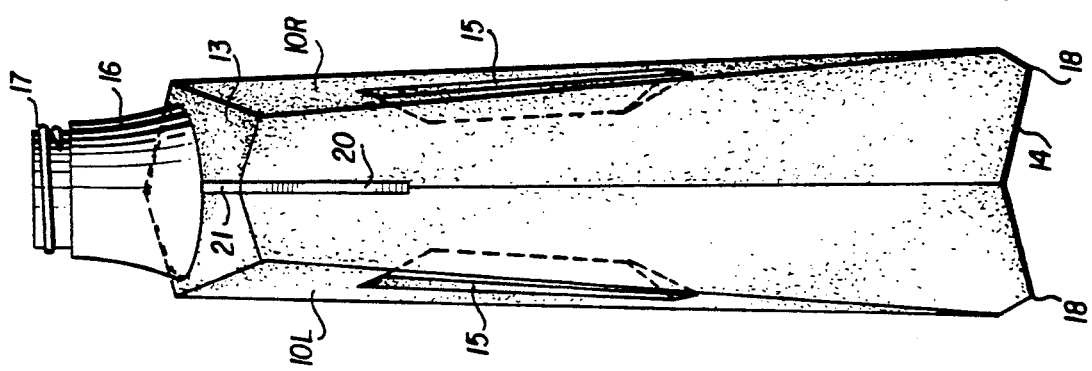
FIG. 2 is a rear end elevational view of the finished bottle article of the invention.

A completed article representative of the present invention is seen by FIGS. 1 and 2 to include a bottle having flat, faceted surfaces for the broad sides 10, the leading edge 11, the trailing edge 12, the top edge 13 and the bottom edge 14. Handgrip depressions 15 are formed in the plane of broadsides 10 to facilitate manual handling. A fill/pour neck 16 extends from the leading edge end of top edge 13 to provide the bottle with a recloseable aperture structure. Thread ring 17 terminates the fill/pour neck 16 to receive a replaceable sealing cap not shown.

Distinctive to the present invention are a pair of bottom rail ridges 18 formed along the planar junction between two facets of the bottle bottom edge 14. These rails provide a stable and rigidly defined support plane for the bottle when filled. A flat bottomed bottle tends to warp under the weight and hydraulic stress of liquid contents into a spherical surface section: a positionally unstable shape.

Except for the fill/pour neck 16 extension, substantially all exterior surface of the present bottle is constructed of paperboard which envelopes the bottle volume.

Definitively, paperboard is a 0.007 to 0.035 inch dried and calendered thickness of wet-laid cellulose fiber. For the present invention, however, 0.018 to 0.028 inch paperboard is preferred although either heavier or lighter paperboard may be used.

Depending on the desired graphic quality, the paperboard may be formed from bleached pulp stock with a clay coated and calendered surface or from recycled paperboard.

As a first step toward finished bottle fabrication, paperboard blanks as represented by FIGS. 3 and 4 are graphically decorated by register controlled printing and cutting presses. Mirror opposite right and left hand blanks R and L are crease scored along the dashed lines between major facet panels to bias fold breaking of the blank along such lines. A crow-foot cut line pattern in the handgrip area 15 permits a converging facet surface depression in that area from the facet plane of broadsides 10R and 10L. Rail crease 18 divides the two bottom edge panels 14R and 14L into two additional facet planes, respectively.

Figure 8:
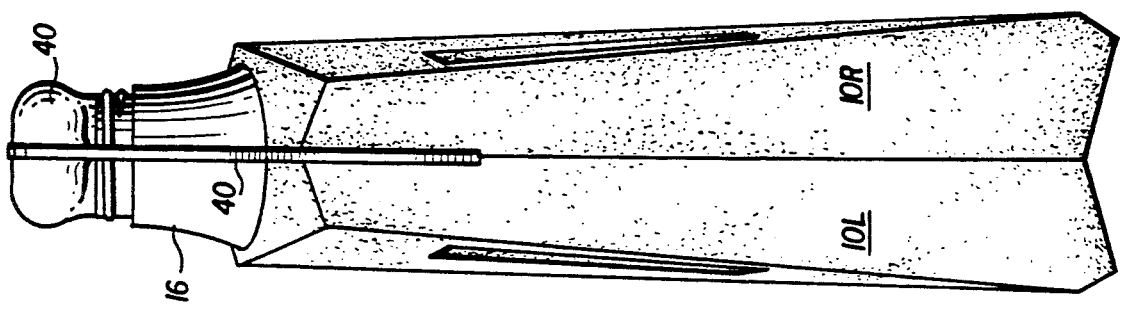
FIG. 8 is an end elevational view of the invention bottle article as removed from the blow mold and prior to flash trimming.
Figure 7:
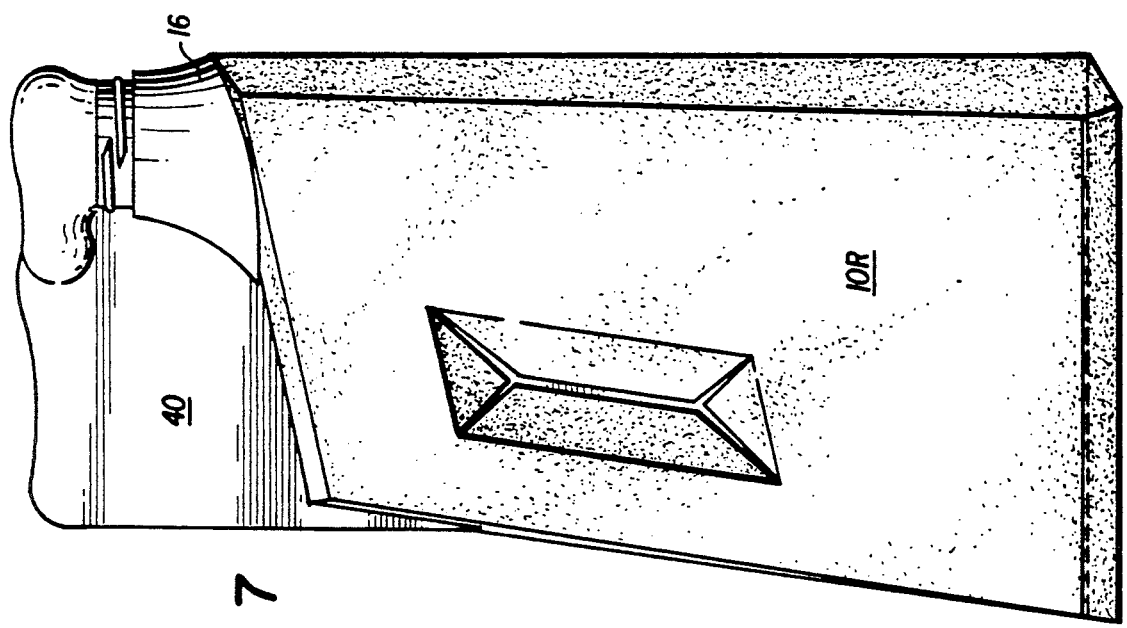
FIG. 7 is a side elevational view of the invention bottle article as removed from the blow mold and prior to flash trimming.

External perimeter edges of both blanks in the mirror opposite pair are dimensioned and cut for a edge-to-edge match in the finished article except for edges 19, 20 and 21 which are set back from a meeting edge line. These set-back edges close upon an uninflated parison to be subsequently described and require a gap distance therebetween to accommodate the collapsed, double wall thickness of polymer squeezed between the opposing edges when the mold halves close as illustrated by the trim flash 40 of FIGS. 7 and 8.

Of particular note to the blank design is a characteristic absence of any tabs or other lapping devices to structurally lock the blank pair together. Material properties of the blow molded polymer liner including tensile strength and adhesive tenacity to adjacent paperboard faces preclude the necessity for any additional joint strengthening across the blank perimeter edge meeting lines or joints. Paperboard edge laps are not precluded by the invention and may be provided as a particular design characteristic or as an unintended manufacturing defect. However, such laps are not required by the invention to secure adjacent paperboard edges together.

Preparatory to blow molding a polymer liner within the vessel volume between a mirror opposite pair of paperboard blanks 10R and 10L, the several blank facet planes are angularly defined by break folding the blanks along the several dashed score lines illustrated by FIG. 3 and 4.

Formation of a polymer liner within a paperboard blank pair is mechanically accomplished by a blow molding wheel apparatus such as described by U.S. Pat. No. 5,009,939. Specific reference is made to that disclosure for the mechanical details. This apparatus includes a multiplicity of mold units mounted on a rotatively driven, circular framework. Each mold unit includes a pair of shells, in this case, mirror opposites, mounted for relatively opposite reciprocation perpendicular to the wheel rotational plane between open and closed mold positions.

Internally, the mold shells include a cavity configured to the final, external shape and dimension of the finished bottle article. Each shell in the mold unit pair defines a respective portion of the total cavity volume. In the special case of a bottle that is completely symmetric laterally of a central plane, cavities respective to the unit pair will be mirror opposites. However, symmetry is not required of the invention and selective departures from symmetry may be designed with appropriate consideration of the paperboard blank configuration.

Figure 5:
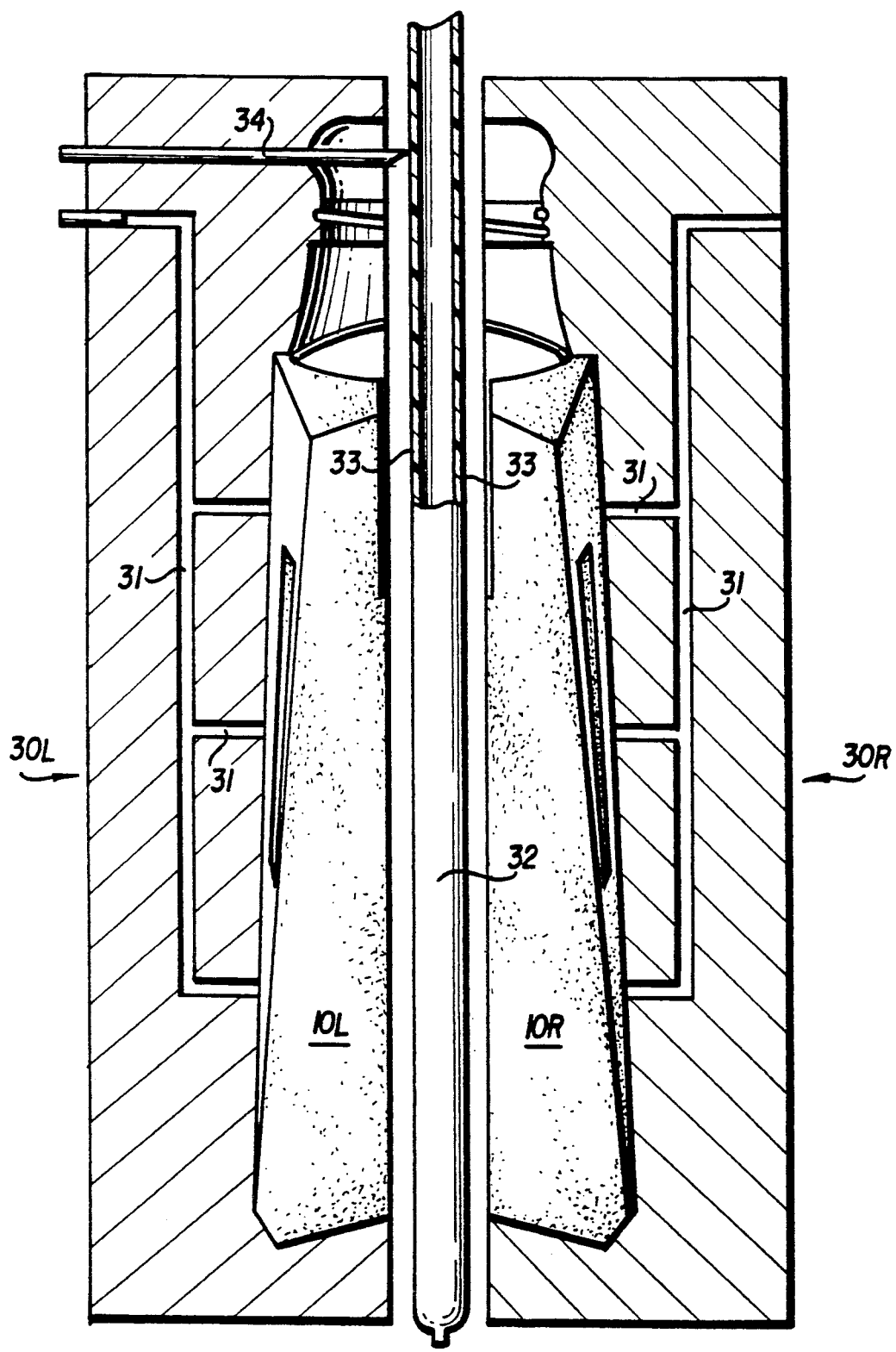
FIG. 5 is a partial section of a blow mold shell pair having a corresponding pair of paperboard blanks positioned therewith.

For the presently preferred symmetrical embodiment, the respective shell cavities of a mold unit pair are substantially mirror opposite voids. When the molds are open, both shells are retracted from a common center plane of closure. When the molds are closed, both shells are in face-to-face engagement at the center plane of closure. This mold reciprocation is coordinated with the angular indexing of the mold frame wheel about the wheel rotational axis. An open mold is presented to the vertical or 12 O'clock position to receive a pair of break fold erected paperboard blanks. This circumstance is represented by FIG. 5 wherein the two mold shells 30L and 30R are withdrawn from the common center plane and a paperboard blank pair 10L and 10R is inserted into the respective shell cavities. A system of vacuum channels and conduits 31 opening into the shell cavities secure positionment of the blanks tightly against the shell cavity walls while open.

Holding the open position with the paperboard blanks in place, rotation of the mold frame wheel carries the blank loaded shells into tangential alignment with a continuously extruded parison 32 of polymer descending vertically from an extruder head. In this particular embodiment of the invention, the parison is a polymer walled hollow tube having a cross-section in the form of a symmetrically elongated oval: i.e. the sectional width is greater along an axis parallel with common center plane than a dimension perpendicular to the center plane. Universally, the parison is a hollow tube bounded by a continuous perimeter wall 33 of hot, viscous polymer.

In the open position, respective mold shells pass on opposite sides of the standing parison extrusion as alignment is approached. Upon reaching alignment with the parison axis, the mold is closed and the opposite shells pinch the parison walls 33 together at both top and bottom ends.

Simultaneous with closure, a blowing needle 34 penetrates the parison wall to deliver a pressurized blowing gas to the internal volume of the parison tube. Expansion of such blowing gas stretches the hot, viscous parison walls 33 into pressing contact with the interior surfaces of blanks 10L and 10R. Such pressure may be as high as 90 psi but more normally is in the order of 40 psi. Under such pressure, the parison polymer is driven deeply into the paperboard surface matrix of fiber for a uniformly tight, intimate bond. Additionally, the parison interior pressure presses the blank more tightly against the mold wall for an idealized fit between the cut perimeter edges of the paperboard blanks. Except for edge-to-edge meeting seams, the resulting paperboard surface is smooth and continuously planar, having no laps or abrupt discontinuities except for the designed facet edges which are sharp and straight.

Figure 6:
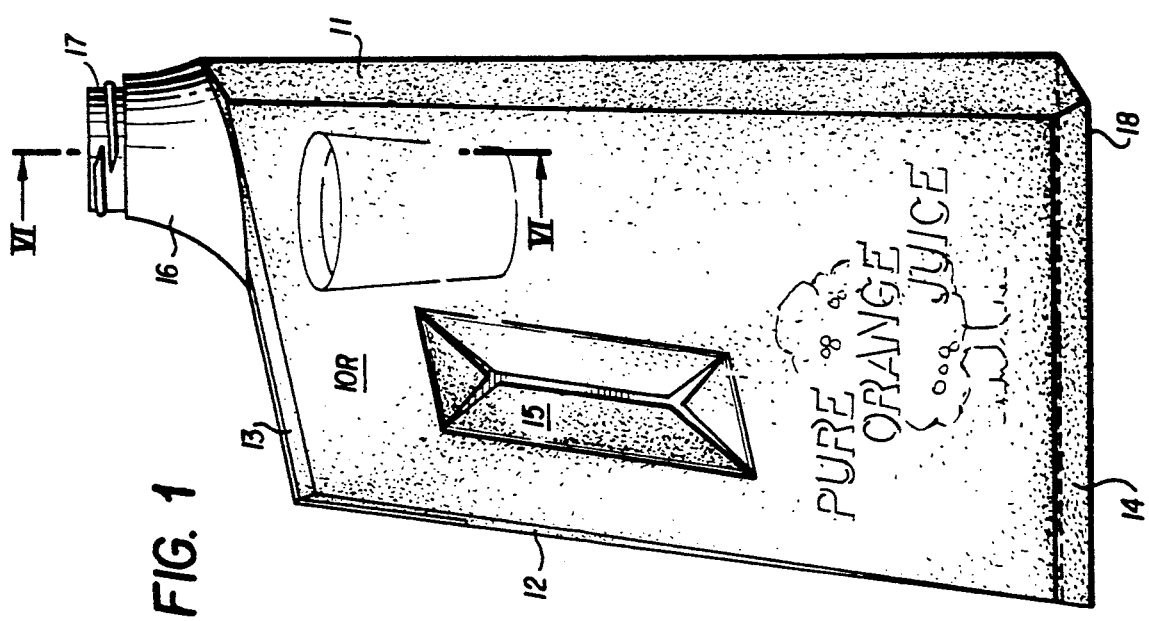
FIG. 6 is a sectional view of the invention bottle article as taken along the cutting plane VI—VI of FIG. 1.

As initially extruded, the parison wall 33 may be of substantially uniform thickness around its continuous sectional perimeter. Expansion of the wall is substantially radial. Since the parison polymer volume is fixed upon closure of the mold, the parison wall thickness diminishes as a direct function of the mold cavity sectional perimeter relative to an initial parison sectional perimeter. Accordingly, the parison wall 33 thickness is substantially thinner upon contact with the paperboard blank inner walls than it was upon initial extrusion. Proportionally, however, the initial parison wall is expanded in the fill/pour neck 16 section much less than in a section of the main bottle body. Consequently, the final fill/pour neck wall thickness is proportionally thicker than the polymer liner within the main bottle body. This circumstance is graphically represented by FIG. 6 showing the polymer liner 35 thickness against the paperboard blanks 10R and 10L to be considerably less than the free standing wall thickness of the fill/pour neck 16. Representatively, a liner 35 thickness may be 0.010 to 0.020 inch thick. For a small 16 to 28 oz. bottle volume, the liner 35 thickness may be as little as 0.005 inch. In the bottle corners, the liner 35 thickness may be as thin as 0.001 to 0.004 inch. Comparatively, the fill/pour neck 16 should have a polymer thickness sufficient to resist screw cap torque of 0.010 to 0.040, depending on the neck length: a dimensional range common to polymer bottles having no paperboard cladding.

Other embodiments of the invention may include parisons of selectively profiled wall thickness. A profiled parison wall is one in which the wall thickness is varied as the parison length is extruded axially. By this means, more or less polymer volume may be placed in selected sectional zones of the invention.

As permutations of the invention described heretofore, it will be understood to those of skill in the art that the paperboard blanks may be provided with an exterior surface coating of protective polymer such a low density polyethylene. Normally, such an exterior coating would be applied to the paperboard roll stock as a curtain coat before printing, scoring or cutting of the blank profiles.

Some blow molding polymers do not adhere well to paperboard. When the functional properties of such a polymer are desired, it may be necessary to coat the blank interior surface with a 0.0005 inch to 0.00075 inch layer of polymer compatible to both paperboard and the paper rejecting polymer. Examples are low density polyethylene and the copolymers of ethylene methyl acrylate and ethylene vinyl acetate. Such an adhesive layer may be curtain coated or press applied onto the paperboard roll stock or included as an outer wall laminae in the extruded parison.

Composition of the parison 32 may be either monolayer or multilayer polymer. Typically, both low and high density polyethylene, Nylon, ethylene vinyl alcohol, ethylene vinyl acetate Plexar, ethylene methyl acrylate ethylene acrylic acid and Surlyn have been used. Laminated combinations of parison polymer are designed to accommodate the intended contents. Products such as juices require a barrier such as ethylene vinyl alcohol to prevent oxidation and flavor scalping. Liquid detergents or cleaners require a Nylon layer to prevent chemical degradation of the container.

For comparable structural rigidity, a solid polymer wall bottle requires approximately 50 to 60 percent more polymer than the present invention. Moreover, the quality of press applied graphics to a bleached and calendered paperboard surface has no comparable peer.

Therefore, as our invention, We claim:

1. A composite fluid container having a paperboard exterior surface and a blow molded polymer interior lining comprising:
   a structural paperboard jacket having a plurality of fold-formed planar facets to substantially envelope an interior volume of said container and having substantially edge-to-edge joint seams between meeting perimeter edges of said jacket;
   a blow molded polymer lining bonded intimately and continuously to substantially all interior surface area of said jacket and continuously bridging said edge-to-edge joint seams; and
   a container aperture means formed as a continuously extended portion of said blow molded lining.

2. A composite fluid container as described by claim 1 wherein said paperboard jacket comprises a plurality of independent paperboard blanks, each being fold-formed to a respective portion of said container interior volume and joined substantially edge-to-edge by said blow molded continuous lining.

3. A composite fluid container as described by claim 2 wherein said plurality of independent paperboard blanks comprises a pair of mirror opposite blanks joined substantially edge-to-edge at a central plane of said container.

4. A composite fluid container as described by claim 1 wherein the thickness of said polymer lining adjacent said paperboard is substantially less than walls respective to said aperture means.

5. A composite fluid container as described by claim 1 wherein said container aperture means is a fill/pour neck having recloseable seal means.

6. A composite fluid container as described by claim 1 having a pair of bottom support rails, said rails being formed by the intersection of facet planes that are fold-formed in said paperboard jacket.

7. A composite fluid container as described by claim 1 having faceted handgrip depressions in the planes of opposite side facets.

8. A substantially fluid impermeable container of the bottle type comprising:
   a pair of cut and break folded paperboard blanks aligned along substantially edge-to-edge joints to substantially enclose a container volume within side, end, top and bottom portions, said bottom portion having at least two break folded ridges in a common plane for stable support of said container on a flat surface; and,
   a thermoplastic polymer lining blow molded into intimate bonded contact with substantially all interior surface area of said blanks, said lining bridging said end-to-end joints to unitize said blanks and said lining as a single, integral article.

9. A container as described by claim 8 comprising a tubular aperture neck projecting from said top portion as an integral continuation of said polymer lining.

10. A container as described by claim 9 wherein said polymer lining is 0.005 to 0.020 inch thick adjacent said paperboard and 0.010 to 0.040 inch thick as an aperture neck tube wall.

11. A container as described by claim 9 wherein said aperture neck includes recloseable seal means.

12. A container as described by claim 8 wherein said ridges are formed by the intersection of two break folded planar panels within bottom portions of respective blanks.

* * * * *